N. D. CRAWFORD.
COMPOSITE SHEET MATERIAL.
APPLICATION FILED MAY 25, 1917.

1,245,196.

Patented Nov. 6, 1917.

4 - ASBESTOS CLOTH
3 - RUBBER + FIBER COMPOSITION
2 - ASBESTOS CLOTH
1 - SHEET IRON

Attest:
S. B. Taylor

Inventor:
Neil D. Crawford,
by Ernest Hopkinson
his Atty.

UNITED STATES PATENT OFFICE.

NEIL D. CRAWFORD, OF ELIZABETH, NEW JERSEY, ASSIGNOR TO NEW YORK BELTING AND PACKING COMPANY, A CORPORATION OF NEW YORK.

COMPOSITE SHEET MATERIAL.

1,245,196.

Specification of Letters Patent.   Patented Nov. 6, 1917.

Application filed May 25, 1917.   Serial No. 170,840.

*To all whom it may concern:*

Be it known that I, NEIL D. CRAWFORD, a citizen of the United States, residing at Elizabeth, county of Union, and State of New Jersey, have invented certain new and useful Improvements in Composite Sheet Material, of which the following is a full, clear, and exact description.

This invention relates to composite sheet material and has for an object to provide a composite sheet which will absorb vibration and act as a non-conductor of sound. This material is adapted for use in the construction of buildings, and for the prevention of communication of vibration from dynamos and other heavy machinery. It is also adapted for use in railway construction to absorb the vibration of passing trains. Material manufactured according to this invention is compact, substantially indestructible, light in weight, and comparatively inexpensive. It is particularly adapted for use in the construction of depots and other buildings near railways and power houses or in other localities where it is essential that the transmission of vibration be minimized.

For a clear understanding of my invention reference is made to the following description and to the accompanying drawings in which—

Figure 1:
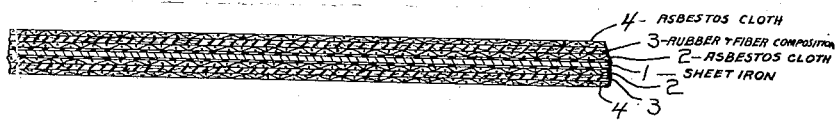
Figure 1 is a cross-sectional view of a sheet of my material.

Referring to the drawings, 1 designates a sheet of metal, preferably iron. 2 designates a ply of asbestos cloth which is placed on each side of the sheet iron 1, or other preferred metal, the asbestos sheet 2 being preferably provided on the side adjacent the metal with a skim coating of rubber composition. Superposed on the asbestos cloth are strata of a non-resilient composition of rubber and fiber 3, upon which are placed second plies of asbestos cloth 4. The structure as built up is compacted by pressure until the strata firmly adhere to each other, and the whole is then permanently set by vulcanization.

Figure 2:
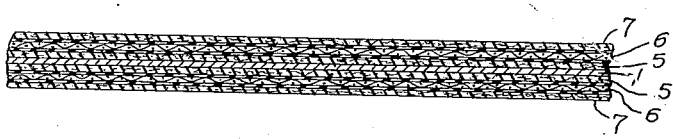
Fig. 2 is a similar view of a modified structure.

In the modified structure illustrated in Fig. 2, on either side of the central metal sheet 1 I provide a stratum of rubber and fiber composition 5. On these strata are superposed sheets of asbestos cloth 6, the latter preferably coated with rubber on both sides. Outer protective layers of rubber and fiber 7 are superposed on the asbestos cloth 6 and the whole compacted and vulcanized as above set forth.

I have found that a composite sheet built up as above described is effective in wholly arresting the transmission of vibration. The sheets of asbestos effectively prevent the transmission of sound and are practically indestructible. The fibrous rubber strata absorb vibration and also provide additional insulation. The central sheet of metal provides the necessary stiffness to the sheet.

For use in the construction of buildings or under machinery I have found the structure illustrated in Fig. 1 to be preferable. When the material is to be used as a cushioning means under railway rails, the structure shown in Fig. 2 is preferable in that the outer strata of fibrous rubber provide a greater cushioning effect.

What I claim and desire to protect by Letters Patent is:

1. Composite sheet material comprising a metallic stiffening member and a plurality of layers of non-resilient material, all of said strata being joined together by interposed layers of non-resilient vulcanized rubber composition.

2. A composite sheet material comprising a central sheet of metal and alternate layers of asbestos and fiber and rubber composition on each side of said metallic sheet, the whole being united by vulcanization.

3. A composite sheet material comprising a central sheet of metal and alternate sheets of asbestos and a fiber and rubber composition on each side of said metallic sheet, the whole being compacted by pressure and set by vulcanization.

4. A vibration arresting material consisting of a compacted and vulcanized composite plate of a fiber and rubber composition, asbestos cloth and sheet iron.

Signed at New York, New York, this 23rd day of May 1917.

NEIL D. CRAWFORD.